US010685344B2

(12) United States Patent
Chua et al.

(10) Patent No.: US 10,685,344 B2
(45) Date of Patent: Jun. 16, 2020

(54) COMMUNICATIONS SYSTEM

(75) Inventors: Huina Chua, Kuala Lumpur (MY);
Simon A Beddus, Ipswich (GB); David Roxburgh, Woodbridge (GB)

(73) Assignee: BRITISH TLECOMMUNICATIONS PLC, London (GB)

( * ) Notice: Subject to any disclaimer, the term of this patent is extended or adjusted under 35 U.S.C. 154(b) by 2186 days.

(21) Appl. No.: 11/994,771

(22) PCT Filed: Jul. 13, 2006

(86) PCT No.: PCT/GB2006/002612
§ 371 (c)(1),
(2), (4) Date: Jan. 4, 2008

(87) PCT Pub. No.: WO2007/012808
PCT Pub. Date: Feb. 1, 2007

(65) Prior Publication Data
US 2008/0201266 A1    Aug. 21, 2008

(30) Foreign Application Priority Data

Jul. 29, 2005  (MY) .................................. 20053529
Nov. 1, 2005   (EP) .................................... 05256745

(51) Int. Cl.
  *G06Q 20/32*   (2012.01)
  *G06Q 20/36*   (2012.01)
  *G06Q 20/12*   (2012.01)

(52) U.S. Cl.
  CPC ..... *G06Q 20/3223* (2013.01); *G06Q 20/1235* (2013.01); *G06Q 20/3674* (2013.01)

(58) Field of Classification Search
  None
  See application file for complete search history.

(56) References Cited

U.S. PATENT DOCUMENTS 6,493,685 B1 *  12/2002  Ensel ................... G06Q 20/102
                                                    705/34
6,983,371 B1 *   1/2006  Hurtado ................. G06F 21/10
                                                    380/255

(Continued)

FOREIGN PATENT DOCUMENTS

EP        0917119        5/1999
EP        1043906        10/2000

(Continued)

OTHER PUBLICATIONS

Microsoft Press Computer Dictionary, 1997, Microsoft Press, Third Edition, p. 505.*

(Continued)

*Primary Examiner* — Jay Huang
(74) *Attorney, Agent, or Firm* — Nixon & Vanderhye PC

(57) ABSTRACT

A method for controlling payment in a communications system including the steps of providing a service accessing a service provider from the or one user device, selecting a product for purchase from the service provider, the service agent receiving a request for payment from the service provider via a payment operator and the service agent issuing a payment authorisation to a payment provider via the payment operator. The service agent is installable in a variety of user devices and provides a uniform interface to the payment system from a plurality of the user devices. The service agent may also provide a uniform interface to an ordering system from a plurality of the user devices.

28 Claims, 3 Drawing Sheets

(56) References Cited

U.S. PATENT DOCUMENTS

2005/0187873 A1* 8/2005 Labrou .................. G06Q 20/02
              705/40
2006/0036554 A1* 2/2006 Schrock .................. G06F 21/10
              705/75

FOREIGN PATENT DOCUMENTS

| EP | 1406156 | 4/2004 |
| WO | 00/35238 | 6/2000 |
| WO | 2005/069237 | 7/2005 |

OTHER PUBLICATIONS

International Search Report dated Mar. 9, 2007.
Powell T., et al., "URL Formulas," HTML Programmer's Reference, 1998, pp. 364-367, XP002140271.
International Search Report dated Sep. 1, 2006 in PCT/GB2006/001999.
Substantive Examination Report dated Apr. 30, 2019 in corresponding Malaysian Application No. PI 20053529, 2 pages.

* cited by examiner

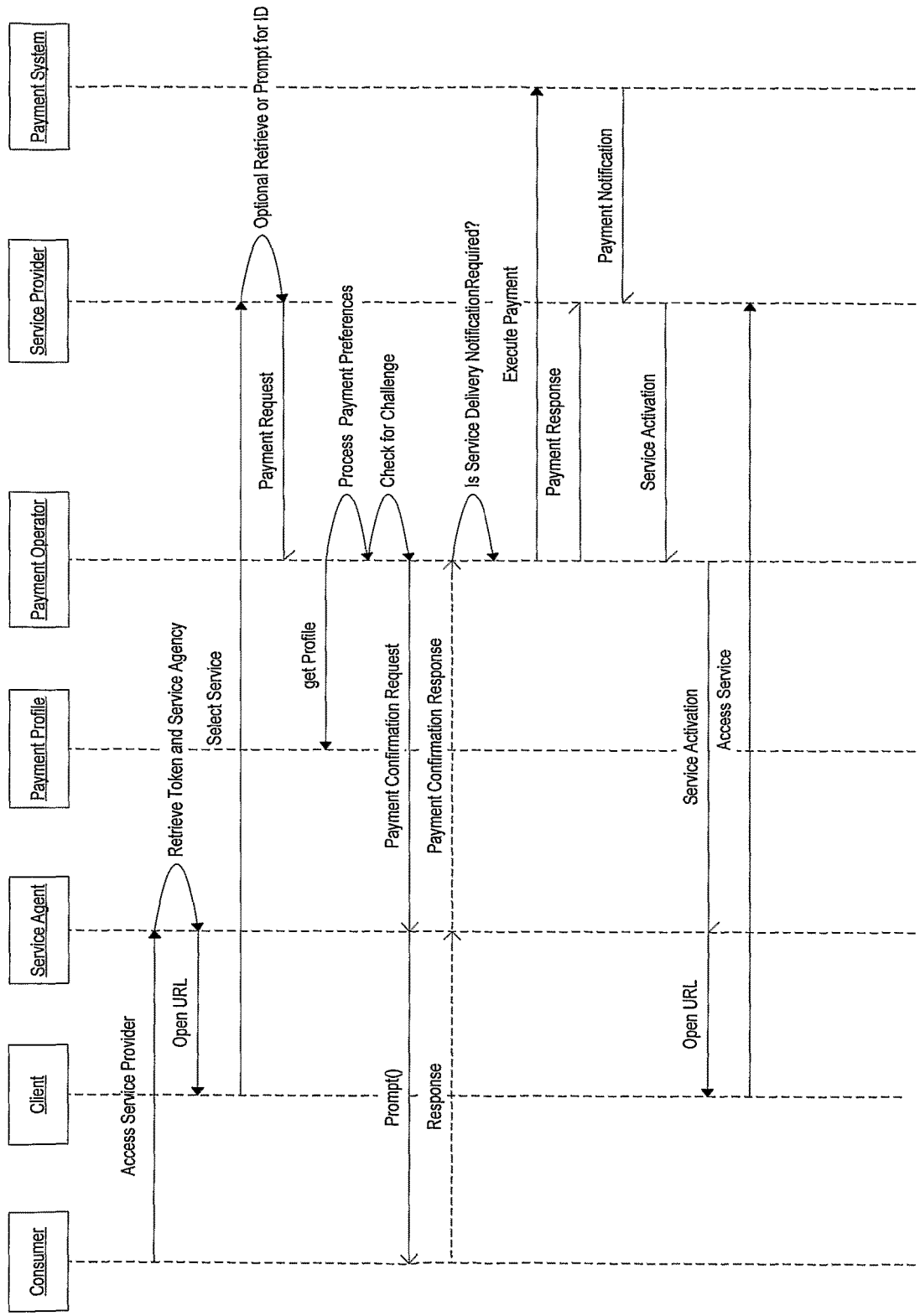
Figure 2: Payment Message Sequence chart without Service Delivery Confirmation

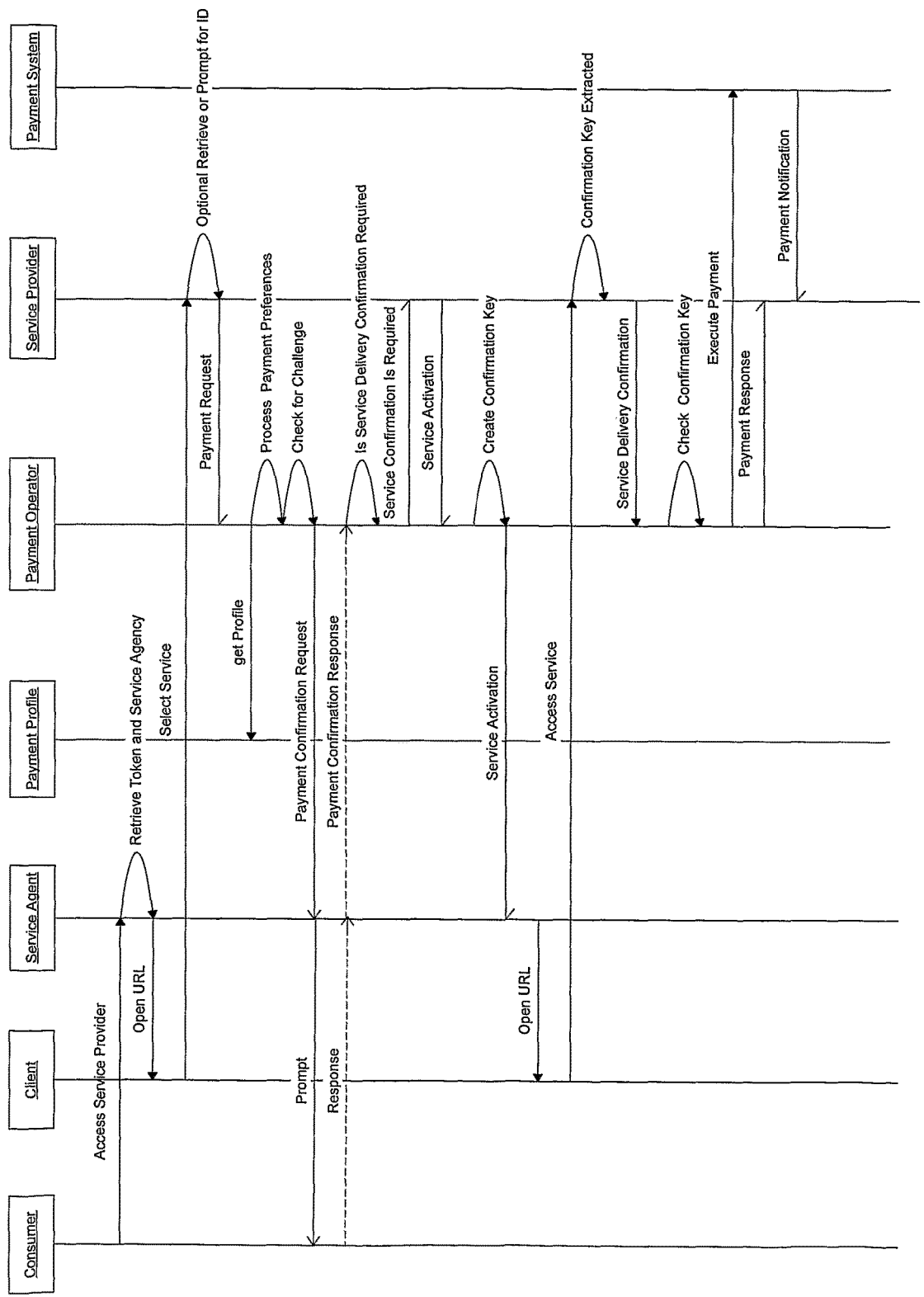
Figure 3: Payment Message Sequence Chart with Service Delivery Confirmation

COMMUNICATIONS SYSTEM

This application is the U.S. national phase of International Application No. PCT/GB2006/002612 filed 13 Jul. 2006 which designated the U.S. and claims priority to PI 20053529 filed 29 Jul. 2005 and EP 05256745.0 filed 1 Nov. 2005, the entire contents of each of which are hereby incorporated by reference.

BACKGROUND

1. Technical Field

The present invention relates to the field of communications systems and, in particular to communications systems for arranging payment for goods or services.

2. Description of Related Art

Service providers active in e-commerce seek to sell services, content or other products to the consumer remotely, via communications systems such as the Internet. Typically, such providers include network operators, digital content retailers and non-digital good sales; indeed any company offering to sell to consumers. Payment is commonly arranged via payment providers that include organisation such as PayPal™; pre- and post-paid network accounts and online banking systems.

Today e-commerce payment systems are limited to two main systems:

SIM-based mobile systems rely on the use of a mobile telephone SIM card application to authenticate the consumer and also pass the identity of the consumer to the vendor: typically in the form of a secure key. The vendor can then use the identity of the consumer to make a payment request to a payment provider (typically restricted to one payment provider which will usually be the mobile network operator). Payment requests are then sent via the payment provider back to the SIM card application on the device for confirmation by the consumer. The terms "consumer" and "user" as used here are equivalent.

This type of mechanism relies on the use of SIM card-based authentication for payment. Thus this system can only be used for payment using SIM-based systems, i.e. mobile phones. The mobile device has to be specially designed to link the SIM card-based application to a suitable browser system. Importantly for an extensibility-based system, it is very difficult to upgrade the system as the payment application is hard-coded in the SIMs of vast numbers of mobiles in use. This makes upgrades costly requiring SIM cards to be reissued to all mobile phone users.

Browser-based payment systems rely on the use of a web browser to handle payments. They make extensive use of cookies and HTTP-redirects to execute payment. Typically, systems like Paypal™ enable consumers to browse vendors' web sites, select items for purchase and then proceed to the "check out". At the checkout, the vendor web site redirects the consumer's browser to a web site operated by the payment provider who then requests authentication of the consumer's identity. The consumer enters their security credentials on the payment provider's web site and, if satisfied, the payment provider retrieves the vendor's invoice complete with each line item. The payment provider then debits the consumer's account or uses an alternative debit mechanism like VISA or MasterCard. The debited amount minus the payment provider's margin is then credited to the vendors account.

An issue for browser-based payment systems are that the experience is clumsy for the consumer. Due to the need for redirection (from service provider to payment system) and with cookie restrictions being commonplace in browsers, transactions can fail: leaving the consumer unsure as to whether they have made a payment or not. In many cases, once the payment is successfully completed, the consumer cannot be returned to the original point on the vendor's web site. Furthermore, with conventional use of web browsers, difficulties can be experienced in obtaining confirmation at the time of payment and the log-on procedure to the payment system can prove lengthy.

In a conventional, browser-based session, network errors during the payment confirmation and authentication phases can lead to failure of purchase and payment that is both costly for the commercial parties (service provider and payment provider) to manage and confusing to the consumer.

Typically, browser-based payment systems are required to support a plurality of diverse systems that includes Microsoft™ IE, Mozilla™; Netscape™, Firefox™, Openwave™, iMode™ and Nokia™. Each one of these browsers exists in multiple versions and may have many variable user settings adding to the complexity and possibly making successful payment processing impossible. Typically, browser-based payment systems cannot be used on mobile devices whilst SIM-based payment systems cannot be used on other devices such as by PCs.

More seriously, fake vendors can set up fake payment (so-called phising) sites where the unwary consumer can be drawn to enter their credentials that can then be used in payment fraud.

In general the overall experience is slow, ponderous and insecure for the consumer and, in the case of radio network access, prone to failure due to higher bit error rate.

BRIEF SUMMARY

According to a first aspect of the present invention, there is provided a service agent for installation in a variety of user devices arranged in use for communication with a payment system comprising one or more remote service providers and one or more remote payment providers for providing a uniform interface to the payment system from a plurality of the user devices. According to a second aspect, the payment system comprises a payment operator. The present invention also extends to a communications system comprising the service agent.

According to a further aspect the invention provides a payment operator for controlling the interaction of one or more user devices, service providers and payment providers for arranging payment for goods or services provided by the service provider.

According to a further aspect the invention provides a method for controlling payment in a communications system including the steps of providing a service agent in one or more user devices, accessing a service provider from the or one user device, selecting a product for purchase from the service provider, the service agent receiving a request for payment from the service provider via a payment operator and the service agent issuing a payment authorisation to a payment provider via the payment operator According to a further aspect the invention provides a service agent for installation in a variety of user communication devices for providing uniform payment behaviour of a plurality of the user communication devices in relation to a payment system.

According to a further aspect the invention provides a method of purchasing goods or services from a service provider in a communications system, including the steps of: installing a service agent on a user device; the service agent registering a user identity with a payment operator and authenticating the user identity to the payment operator; the service agent opening via a client on the user device a connection from the user device to the service provider; and identifying the user and the payment operator to the service provider; via the client browsing and selecting a service from the service provider; receiving at the service agent from the payment operator a payment confirmation request based on a payment request from the service provider to the payment operator; confirming by the service agent payment with the payment operator and receiving the goods or services from the service provider.

According to a further aspect the invention provides a payment operator for controlling the interaction of one or more user devices, service providers and payment providers for arranging payment for goods or services provided by the service provider. in which the payment operator comprises: means for receiving a payment request from a service provider; means for sending a payment confirmation request to a user device and for receiving a response from the user device; means for passing the user response to a payment provider; means for passing a confirmation key to one of the service providers to initiate the provision of goods or services to the user; means for passing a service activation key from one of the service providers to the user device. According to a further aspect, the payment operator comprises means for generating and passing a service confirmation key to the user device with the service activation key.

According to a further aspect the invention provides a service agent for installation in a variety of user devices arranged in use for communication with a payment system comprising one or more remote service providers and one or more remote payment providers for providing a uniform interface to the payment system from a plurality of the user devices; in which the service agent comprises: function activation means for activating a function on the user device; in which the function activation means is arranged in use to activate the function to contact one of the service providers; in which the activation means is arranged in use to activate the function to download content from one of the service providers; service activation means comprising means for accepting a service activation key from the payment operator and for forwarding the service activation key in order to initiate service delivery.

According to a further aspect the invention provides a method for controlling payment in a communications system including the steps of providing a service agent in one or more user devices, accessing a service provider from the or one user device, selecting a product for purchase from the service provider, the service agent receiving a request for payment from the service provider via a payment operator and the service agent issuing a payment authorisation to a payment provider via the payment operator. According to a further aspect the method includes the steps of accepting a service activation key from the payment operator and providing the service activation key to the user with a prompt for the user to send the service activation key to one of the service providers in order to initiate service delivery. According to a further aspect the method includes the steps of accepting a request for payment from one of the service providers via the payment operator and prompting the user to action the request.

According to a further aspect the invention provides a method of purchasing goods or services from a service provider in a communications system, including the steps of using a service agent on a user device to register a user identity with a payment operator and authenticate the user identity to the payment operator; open via a client on the user device a connection from the user device to the service provider; identify the user and the payment operator to the service provider; via the client browse and select a service from the service provider; receive from the payment operator a payment confirmation request based on a payment request from the service provider to the payment operator; confirm payment with the payment operator; so that the user receives the goods or services from the service provider.

According to a further aspect the invention provides a method of purchasing via a user device goods or services from a service provider in a communications system, including the steps of receiving at a payment operator a payment request from the service provider, creating and sending a payment confirmation request to a service agent on the user device retrieving user preferences stored in the payment operator and processing the payment request in accordance with the preferences. According to further aspects, the invention provides the steps of blocking or allowing service providers in accordance with the retrieved user preferences; the steps of identifying payments that do not require confirmation in accordance with the retrieved user preferences; the steps of sending the payment confirmation request to a plurality of service agents on a plurality of user devices; the steps of sending the payment confirmation request to a service agent selected from a plurality of service agents on a plurality of user devices; the steps of selecting the service agent on the basis of authentication information provided to the payment operator by the service agent; the steps of detecting a user device without service agent, prompting the user, receiving a response from the user and downloading a service agent to that device in response to the user response; the steps of notifying the service provider that service delivery confirmation is required, receiving from the service provider an activation URL and forwarding the activation URL and a service confirmation key to the service agent; and according to which the payment operator receives from the service agent a payment confirmation, checks the payment confirmation and if correct pays the service provider on behalf of the consumer according to the payment request.

To aid understanding, the present invention will now be described in more detail with reference to specific embodiments of the invention. It will be appreciated that only a limited number of embodiments can be described and that the invention is not intended to be limited to the embodiments described but instead should be accorded the scope defined by the accompanying claims.

In the drawings

FIGS. 2 and 3 show message sequence charts.

DETAILED DESCRIPTION

Figure 1:
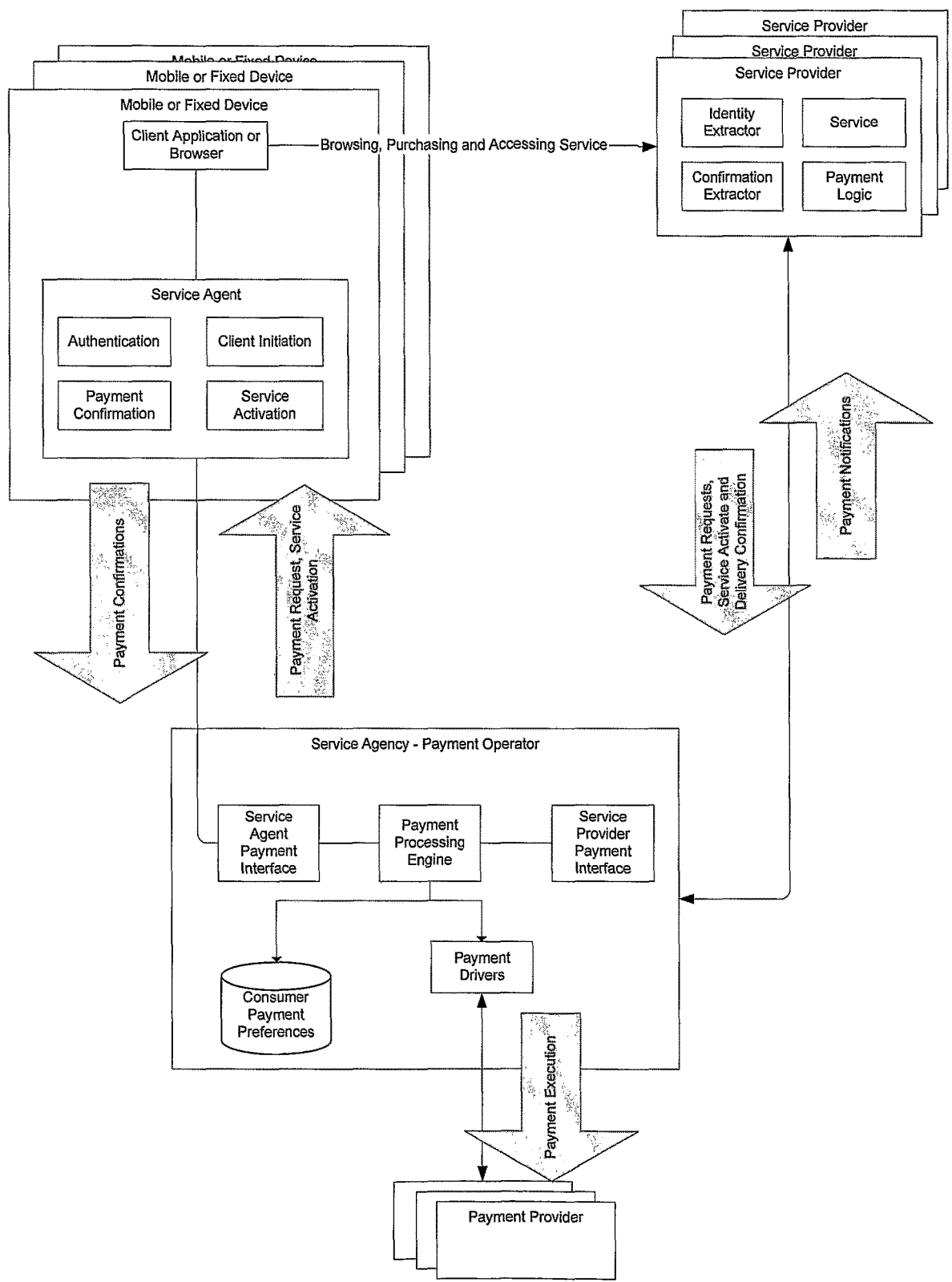
FIG. 1 shows a system block diagram.

FIG. 1 shows a block diagram of a system according to a first aspect of the invention. As shown in FIG. 1, a service agent is installed on each of a users communications devices. These devices can include one or more mobile phones, air-interfaced laptop computers or PDAs desktop computers connected to the telephone line or other processing device connected to the larger communications network such as the Internet either via a mobile phone network, the conventional wired telephone network or in some other way.

Each service agent communicates with client applications (browsers etc) local to that device and handles payment transactions for the user. According to one aspect of the invention, the user device is in direct communication with the one or more service providers but all payment transactions are handled via a remote, network-located payment operator. To this end, the payment operator is in communication with the service providers and payment providers. Although not shown in the figure, the service agent could in a further aspect of the invention be arranged to deal direct with service providers and payment providers on behalf of the user.

The service agent is a small application that may exist in one or more forms suitable to be installed onto the diverse range of programmable user devices listed above. The service agent acts to separate payment functions from conventional client applications running on the user's device (e.g. processing, web browsing, email, telephone calls). Separation of these functions simplifies consumer browsing, payment and purchasing dialogs and addresses common client application issues (e.g. browsers that suppress pop-up windows).

Service agents are generally installable applications that can support a number of consumer dialogues including authentication enabling a consumer to prove their identity for access to services and online payment enabling a consumer to confirm purchases and effect payment to service providers.

Common operating system calls are used by the service agent to communicate with other client-based applications such as browsers. The service agents are simple applications using cross-platform technology like Java and ".Net"s suitable for installation on a diverse range of devices. For example, a Java midlet uses operating system "platform requests", passing a universal resource locator (URL—e.g. a telephone number) to which the device operating system would respond by setting up a call. Alternatively the parameter (URL) could be an email address causing the device to open the appropriate application, e.g. mail browser. The service agents support multiple devices and being installable applications, can be upgraded on demand.

The service agent is implemented as an application providing a uniform interface to the payment operator that can easily be installed into mobile communications devices running operating software from Symbian™, Microsoft™ and others including mobile phones, personal digital assistants and fixed communicating devices such as personal computers. Typically, installation of the service agent application may be performed over the air via a mobile telephone network, through a wired connection or via personal area network such as Bluetooth™.

The service agent supports the following features:
Authentication
Client Initiation
Payment Confirmation
Service Activation The Authentication function enables the consumer to authenticate the service agent with the payment operator. The authentication typically involved the service agent providing to the payment operator a username (principal) and password (credential) but can include other mechanism such as X.509 certificates. Once the user is authenticated, the payment operator is able to vouch fro the user to suppliers, removing the need for repeated logging in on the part of the user. Separate authentication will be required for each device that the user wishes to use in this way. In the case of personal devices such as mobile phones once the user logs on to the SA they could effectively be logged on for weeks, relying on overall device security provided by the normal screen lock and PIN mechanism.

The service agent provides a function for opening client applications on behalf of the consumer. The Client Initiation (or activation) function enables the service agent to open a client (typically or web browser or another application on the same user device) with a unique ID or token. Once the consumer selects a service provider, a unique token or ID is passed to the client application from the service agent. In the case of a browser, a token/ID can be added to the service provider URL as a HTTP header parameter. The benefit of this approach is that hidden tokens such as the consumer's ID can be passed to the client and then included in the subsequent dialogues between the client (browser) and the service provider. Traditional browser-based systems demand that the consumer logs in or identifies themselves in some fashion when they access each service provider. Without this function, the consumer would have to manually login or enter an identity each time they accessed a service provider.

An example of a simple URL is as follows:
http://www.acme.com?id=maisyT@serviceA.com
where
1. "maisyT" is the ID of the consumer.
2. serviceA.com is the name of the payment operator.

An example of an alternative URL is as follows:
http://www.acme.com?id=jkl6m83wr89d@ serviceA.com
where "jkl6m83wr89d" is a unique key that may be used to hide the true identity of the consumer.

The secure key could be generated as follows:
The service agent can generate a key randomly every time a client application is opened. It can then synchronize the unique key with the payment operator;
The service agent can generate a key using an algorithm shared between service agent and payment operator such that the payment operator can generate the same key itself; or
A long list of keys previously generated and synchronized between service agent and payment operator may have been provisioned to the service agent.

Other applications can use this information user identification in various ways. The service provider can use this information to track a users behaviour such as browsing activity or user interactions prior to a request for charged content. This allows an identifiable session with the consumer to be maintained such that, when a purchase is made, the consumer does not have to be prompted for authentication of identity. Likewise the tracking may be used to generate usage and browsing statistics of consumer behaviour. The service provider can then rely on the received service agent token/ID to identify the service agent and the consumer. The token or ID may be generated locally by the service agent or may be created in conjunction with the payment operator.

The Payment Confirmation function enables the service agent to prompt the user to action incoming requests for payment. Typically, the user will be notified via an audible signal, vibration or visual method that a payment requires confirmation. The identity of the service provider and details of the various line items (goods), individual price and total price are typically included in the request for payment that the consumer is presented with. At the same time, the user is presented with potential payment methods such as Paypal, pre-paid or post-paid phone accounts and other online payment systems. The consumer can select to confirm the payment and choose the payment method.

The Service Activation function enables the payment operator to deliver a service activation URL (originally from the service provider) to the service agent. The service agent can then prompt the consumer to open the URL in a browser or other suitable client application. This results in the client contacting the service providers web site and initiating service delivery.

An example service activation URL is as follows:
http://www.acme.com?activationCode=09df0934mdf
Where:
"09df0934mdf" is the activation code provided by the service provider The payment operator can add a unique service confirmation key to the service activation URL. The service provider can retrieve this unique key from the URL used to access its web site. The retrieved key represents proof that the service provider can use to demonstrate to the payment operator or to the consumer that the consumer has accessed the service.

An example service activation URL with unique key is as follows:
http://www.acme.com?activationCode=09df0934mdf&deliveryConf=kldf8934c
where:
1. "09df0934mdf" is the activation code provided by the service provider;
2. "kldf8934c" is the unique service delivery key created by the payment operator.

The payment operator provides the ability to handle payment requests from service providers. The payment operator holds consumer payment preference information. Preference information may be used to block or allow service providers automatically without confirmation being required from the consumer. In most cases the payment operator will request the consumer to confirm the payment through a dialogue in a service agent. Once confirmed. the payment operator makes the payment on behalf of the consumer. The payment operator supports multiple payment mechanisms so as to hide complexity from both consumers and service providers. In the case of the consumer, the payment operator stores the necessary URLs and credentials to enable the payment operator to make payments via the various payment providers. The payment operator also provides a single repository for receipts for consumers.

The payment operator will typically be implemented as an enterprise computing system such as Windows enterprise or J2EE computing components supporting web services, messaging and database running on one or more computing devices and supports the following features:
Service Agent Payment Interface
Service Provider Payment Interface
Payment Processing Engine
Consumer Payment Profile
Service Delivery Confirmation The Payment Operator Payment Interface enables service agents to send payment confirmation to the payment processing engine. The payment processing engine can be implemented as a web service.

The Service Provider Payment Interface provides an interface that enables service providers to make payment requests and activate services. The interface will be implemented as web, service as defined in section 2.4.1.

The Payment Processing Engine implements the payment logic receiving payment requests from service providers. It then handles the subsequent dialogue with the service agent, service provider and payment systems. The payment processing engine works in conjunction the Consumer Payment Profile.

The Consumer Payment Profile is used to make decision on how to handle payment requests from the service providers, i.e. identify which payments require confirmation. The Consumer Payment Profile will either decide to block those it does not want to deal with; allow interaction with user to allow the user to decide or allow payment to be conformed automatically without involving the user.

The Service delivery confirmation function is supported to reduce the risk of dispute between consumers and service providers. In all cases the mechanism works by withholding the final payment to the service provider until it can be proved that the service has been delivered. According to further aspects of the invention:

J2EE or Java 2 Platform, Enterprise Edition is a widely-used programming platform for developing and running distributed applications, based largely on modular components running on an application server. Java EE includes several API specifications and includes Servlets, and several Web Services technologies. This allows the developer to create an enterprise application that is portable between platforms and scalable, while integrating with legacy technologies. Windows Server System provides enterprise computing features such as programming models, transaction management, database connectivity, web service, XML parsing, web hosting, mail and presence servers, etc.

The payment operator is a single component able to both support payment dialogues and perform the required payment actions for a plurality of service agents. Service agents can communicate with the payment operator using the usual web services toolkits available on client devices such as Microsoft web service toolkit, Java Web Service toolkits, SOAP and Apache AXIS.

In another aspect of the invention, where a service agent is not installed on the consumers chosen device, the consumer will be prompted by receiving a email, SMS or instant message incorporating a URL to download a service agent from the payment operator. Where download cannot be achieved for any reason, the consumer could be offered an alternative web-based interface though this would not provide all of the advantages of the service agent approach.

This gives the user very much better control with a clear indication of what they are buying and the actual amount they are paying. If a consumer were to inadvertently select a product that they do not wish to purchase then they can use the "decline" option in the payment confirmation procedure to terminate the payment and hence the purchase. The payment and later, service-activation functions do not interfere with the usual browsing function leaving the consumer free to carry on browsing.

The service agent interacts with the payment operator by generating a purchase request and processing the confirmation request received from the payment operator in return. The payment operator detects the purchase request and ensures that the confirmation request is sent to the appropriate service agent. In most cases, the "appropriatd" SA will be the one generating the request but, should that one become unavailable during the payment process, then another SA will be selected. This is another advantage of having access to the consumer via a plurality of devices offering a standard interface.

In one aspect of the invention, the purchase operator copies messages to a plurality of service agents to better cope with the possibility that the user could change devices with appropriate safeguards to ensure detection of situations where the consumer has confirmed the same payment twice. According to another aspect, the request is sent to a preferred service agent but, if there is no response within a set period (say 30 seconds), then the confirmation request will be sent to other service agents.

When the service agent registers and authenticates to the payment operator, it can use a variety of endpoint addressing systems. The choice depends on the desired openness of the communication system i.e. whether the implementer chooses a public addressing system such as SIP or whether they use a proprietary system. For example, if the system were implemented using SIP-Simple messaging, the service agent would register itself with the SIP proxy resident on the payment operator. The SIP proxy actually uses the IP&port numbers from the SIP registration so that it can contact the service agent. SIP usually registers a UDP port though it can support TCP.

An example SIP address for a service agent would comprise a SIP URL such as sip:f/hjkroi34h34@ service-agent.com where:

"hjkroi34h34" is an example of a unique registration key associated with the service agent. The service agent's SIP stack would listen out on a specific port for incoming messages from the payment operator. Typical port numbers are in the range 5060 upwards. As usual, the IP and port number would be passed in the registration message to the SIP proxy in the payment operator.

An alternative would be for instance to develop a proprietary system that registers an IP address or port. Similar to the SIP registration, a XML registration message is used with a unique key e.g. "hjkroi34h34" for the service agent. Due to issues with network address translation and firewall issues in mobile networks it is seen as advisable that the service agent registers and maintains a TCP connection with the payment operator. The payment operator maintains a handle to the TCP connection in a database along with the unique service agent key. This is similar to the system used in instant messaging systems today such as Yahoo, AIM and Jabber.

The service agent model requires only a single interface to be provided by the payment operator. Typically, the payment operator will advertise a single web service using a conventional mechanism such as WSDL or web page. The web service listens on an IP address and port and can accept many requests at one time. In cases of moderate to extreme demand the payment operator can use the standard web practices of TCP/Web load balancers that spray web service requests over many web service servers. A plurality of web service server hosts result in a plurality of payment operator instances.

The payment operator does not have to deal with multiple client behaviour: instead it only need support the single, uniform service agent interface behaviour, even though the implementation of the various service agents it deals with may be different, as required to fit with different consumer devices. The payment operator provides a simple web service supporting the exchange of XML documents or exposing a remote procedure call using mechanism such as SOAP.

The service provider needs to be able to determine the identity of the consumer. The service provider will see normal consumer browsing but for payment will deal with the payment operator. The service provider typically delivers the content by initially sending the payment operator a service activation URL. This URL is passed to the service agent that can then open browser application to access the service. These are all standard functions of service providers, indeed all service providers are well acquainted with dealing with various payment and delivery systems.

Payment Logic
Identity Extractor
Confirmation Extractor
Service

Service providers are free to use their existing internet style delivery systems such as MMS, Web Download, media streaming or Open Mobile Alliance over the air provision, they need only provide the basic functions described here. Service providers typically have a set of these functions for each sales channel/partner, and so will easily be able to provide one additional function set.

The Payment Logic works in conjunction with the service provider's access control mechanisms to determine when and how payment requests are made.

The Identity Extractor function is designed to extract the identity/token and, in the case of HTTP/HTML sessions, apply it to responses to maintain the sessions.

The Confirmation Extractor function is designed to extract the unique confirmation token applied to track whether the consumer has tried to access the service. Typically this function will remove the unique token from HTTP. Once extracted by the service provider, the unique token is applied back to the payment operator to complete the payment process.

The Service is the content service or network service itself, e.g. the product on sale.

Connectivity to Other Components.

The service agent communicates with the payment operator through XML messaging and remote procedure calls using mechanisms including web services and proprietary messaging systems. A suitable proprietary messaging system could use Jabber protocol or TCP sockets to exchange messages. Suitable standard messaging systems could include SIP-Simple or JMS.

XML documents flow between the service agent and payment operator. These documents can be encapsulated into a SOAP envelope and can be sent using SOAP RPC or via messaging mechanisms such as SIP, MMS, JMS and TCP or proprietary system The link is typically encrypted using SSL or VPN technology.

A payment request confirmation may be sent from the payment operator to the service agent as indicated in the following XML code:

```
<?xml version="1.0" encoding="ISO-8859-1"?>
< paymentrequestconfirmation version="0.01">
 <SAtransactionID>hjkfd8934</>
 <serviceproviderName>
  <name>My Mobile Shop</name>
  <id>12345</id>
  <url>http://www.mymobileshop.com</url>
 </serviceproviderName>
 <item>
  <item code>00202304</>
  <name>Advanced Java for Mobile Devices</name>
  <description>A best-seller the world over</description>
   <type>Non-Digital</type>
   <image>http://www.mymobileshop.com/images/book1.gif</image>
  <currency>GBP</currency>
  <price>20.00</price>
 </item>
 <item>
  <name>Cadbury Easter Egg</name>
  <description>A perfect gift for Easter</description>
  <category>Food</category>
   <type>Non-Digital</type>
  <image>http://www.mymobileshop.com/images/food1.gif</image>
```

```
    <currency>GBP</currency>
    <price>5.99</price>
  </item>
  <total>
    <currency>GBP</currency>
    <price>25.99</price>
  <total>
  <paymentmethod>
    <name>PayPal</name>
    <account>9348738</account>
  </paymentmethod >
  <paymentmethod >
    <name>HSBC</name>
    <account>87823423</account>
  </paymentmethod>
</paymentrequestconfirmation >
```

Where:
    SAtransactionID is global transaction ID created by the payment operator.
    item is individual line items.
    total is the total payment amount
    paymentmethod is acceptable payment methods The response may be sent back from the service agent to the payment operator using the similar mechanisms as indicated in the following XML code:

```
<?xml version="1.0" encoding="ISO-8859-1"?>
<paymentconfirmationresponse version="0.01">
  <SAtransactionID>hjkfd8934</SAtransactionID>
  <confirm>accept</confirm>
  <paymentmethod >
    <name>HSBC</name>
    <account>87823423</account>
  </paymentmethod>
</ paymentconfirmationresponse >
```

Where:
    SAtransactionID is global transaction ID
    confirm is the keyword for confirming payment
    paymentmethod is suggested payment method The Service Activation URL may be delivered from the payment operator to the service agent as indicated in the following XML code:
<?xml version="1.0" encoding="ISO-8859-1"?>
<serviceactivation version="0.01">
  <SAtransactionID>hjkfd8934</>
  <url>http://
    www.acme.com?activationCode=09df0934mdf&</>
  <serviceDeliveryConfirmationKey>kldf8934c</>
</serviceactivation>

Where:
    SAtransactionID is global transaction ID
    url is unique URL for the consumer to access the content from.
    serviceDeliveryConfirmationKey is the key created by the payment operator for validating that a user has accessed a service.

This would result in the client application browser being opened with:
http://www.acme.com?activationCode=09df0934mdf&deliveryConf=kldf8934c The service agent communicates with client applications through operating system calls or through TCP sockets.

Where the content delivery mechanism supports embedded delivery confirmation, the delivery confirmation is performed by the payment operator. This is achieved by the service provider encoding the confirmation request to include the URL of the payment operator and include details of the transaction. Final payment execution is not performed until the confirmation arrives.

In the case of super distribution of digital content (i.e. where digital rights are delivered separately to the media, e.g. the media is delivered without security but remains unusable until a separate rights activation code is provided) the payment operator may be requested by the service provider to act as the delivery agent for both rights and confirmation service. Once the digital rights have been delivered the payment may be executed.

In the case of a network service and for some content services, the service provider can request the payment operator to forward a service initiation URL. The payment operator adds a unique confirmation ID to the URL and forwards it to the consumers service agent. The service agent opens the encoded URL in a browser and connects to the service provider. Once the service initiation request is received by service provider, the unique confirmation ID can be extracted and presented to the payment operator as proof that the service has been delivered (this mechanism is detailed in the later mode of operation description).

The service provider communicates with the payment operator via XML messaging and remote procedure calls using mechanisms including Web Services and proprietary messaging systems. See earlier description.

XML documents flow between the service provider and payment operator. These documents can be encapsulated into a SOAP Envelope and can be sent using SOAP RPC or via messaging mechanisms such as SIP, MMS, JMS and TCP or a proprietary system The link is typically encrypted using SSL or VPN technology.

The service provider messages such as paymentrequestconfirmation and serviceactivation are equivalent to the service agent messages paymentrequestconfirmation and serviceactivation They differ in minor details such as:
    The paymentrequest message does not use the SAtransactionID.
    The paymentrequest message uses the extra field of serviceProviderUniqueId to tie together the service agent SAtransactionID and their own internal processes.
    The serviceactivation message does not use the serviceDeliveryConfirmationKey.

The only unique message is the payment response as follows:

```
<?xml version="1.0" encoding="ISO-8859-1"?>
<paymentresponse version="0.0.1">
  <serviceProviderUniqueId>a9034nb</serviceProviderUniqueId>
  <SAtransactionID>hjkfd8934</SAtransactionID>
  <confirm>accept</confirm>
  <paymentmethod >
    <name>HSBC</name>
    <account>87823423</account>
  </paymentmethod>
</ paymentresponse >
```

Where:
    serviceProviderUniqueId is the unique ID passed in the original paymentrequest.
    SAtransactionID is global transaction ID
    paymentmethod is suggested payment method Modes of Operation.

A payment message sequence without service delivery confirmation will now be described with reference to FIG. 2. The consumer accesses details of a service provider stored in the service agent. In order to contact the service provider, the service agent retrieves a token and creates a URL such as: http://www.acme.com?id=maisyT@serviceA.com. The client opens a connection to the service provider. The service provider receives the request. The consumer can browse the service through the client browser. The service provider maintains a session through the supplied ID. At the time of purchase, the consumer selects a service. If the token/ID was not supplied originally or is not available then the consumer may be prompted to add their details.

A payment request is sent by the service provider to the payment operator; the payment-processing engine at the payment operator retrieves the consumers payment preferences, creates and sends a payment confirmation request to the consumers service agent. If the consumer has access to more than one device, the choice of service agent can be deduced by the payment operator e.g. from previous authentication information.

Final payment execution (i.e. placement and completion of payment with a payment provider) is made by the payment operator and the service provider is notified. At this point, the service provider may use the service activation function to send an activation message to the consumer. The service activation message is delivered through the service activation interface to the service agent. The service agent (under the control of the consumer) opens a client application to access the service.

A payment message sequence with service delivery confirmation will now be described with reference to FIG. 3. The service provider is notified by the payment operator that the service delivery confirmation is required. The service provider sends an activation URL via the payment operator. The payment operator sends the activation URL and service confirmation key to the service agent. The service agent opens the client application that sends the request to the service provider. The service provider extracts the delivery confirmation key and sends a service delivery confirmation message (containing the key) to the payment operator. The payment operator checks the key and if correct pays the service provider on behalf of the consumer as requested.

The payment operator provides a single, uniform interface between the (potentially numerous) user's devices, the multitude of service providers and the various payment systems.

The service agent provides a uniform interface to the payment operator; includes a plurality of similar functions embedded in various user-devices, so reducing the complexity of the payment operator; handles, with client initiation, payment confirmation and service activation (functions that are removed from the usual browser-based session).

The system enables service providers to track consumers prior to purchase request payment through ID/token tracking.

This system can support multiple payment providers. This is performed through the payment operator implementing custom payment drivers for each payment provider. This approach is preferable to each service provider developing, installing payment drivers or, worse still, the client having to communicate with multiple payment providers.

The invention described above and claimed in the following claims provides for all payments can be confirmed by the user reducing the chance of fraud; presents a single payment confirmation dialogue to the consumer irrespective of payment providers; records all electronic receipts for the consumer irrespective of payment providers; service activation under the control of the consumer such that a consumer can request a service, receive the activation key and wait until later to activate it; can be used to support payment on request or payment on activation; allows the consumer to specify preferred service providers and price limits that don't require confirmation; is fast and easy to use. According to the invention, the consumer selects a service provider from their service agent, it opens a browser and takes them to the service provider site, they select the service they want, and a payment confirmation prompt window is opened by the service agent. As a result, the invention reduces the risk of fraud using centralised trusted payment operator. Web navigation is made easy for the consumer by separating payment and service or content browsing.

The present invention advantageously provides a communications system where the logic controlling the operation is distributed between user device-based resident service agents, potentially many service providers and payment providers and in an aspect a network-based payment operator.

The invention claimed is:

1. A non-transitory machine-readable storage medium storing instructions installable to a plurality of user devices having different types of processing systems, each processing system including a hardware processor and associated local memory, the instructions being configured to be executable, by the particular user device on which the instructions are installed and run, to provide a service agent configured to at least:
   (a) communicate with a remote operator of computer-mediated services;
   (b) provide a uniform interface to the operator for the plurality of the user devices;
   (c) provide a client interface for activating a client on that particular user device;
   the client interface being configured to at least:
   (d) activate the respective client to contact service providers that are separate and remote from the operator and the plurality of user devices;
   (e) selectively activate the respective client to download content from the service providers; and
   the service agent being further configured to provide computer-mediated functions for the respective client, comprising:
      authentication with the operator of the identity of a user of that particular user device;
      reception, from a first one of the service providers via the operator, of an electronic request indicating payment required for a service to be provided by the first one of the service providers, and provision of a prompt to the user to act on the received electronic request in response to situations in which (i) the client on that particular user device has contacted the first one of the service providers and requested that service to be provided by the first one of the service providers, and (ii) another service agent instance on another user device activates another client, on the another user device, to contact the first one of the service providers and request that service to be provided by the first one of the service providers;
      reception of a service activation key from the operator;
      forwarding of the received service activation key in order to initiate the service to be provided by the first one of the service providers; and
      provision of the received service activation key to the respective client to initiate download of content, automatically and without user intervention, by the respective client, as part of the service delivery to be provided by the first one of the service providers.

2. The non-transitory storage medium as claimed in claim 1, wherein the client interface of the service agent is further configured to activate a browser as the activated client.

3. The non-transitory storage medium as claimed in claim 1, wherein the service agent is further configured to provide a uniform interface to an ordering system from the plurality of the user devices, the user devices being configured to communicate with the ordering system, and the ordering system comprising one or more of the remote service providers.

4. The non-transitory storage medium as claimed in claim 1, wherein the client interface is further configured to pass a user identifier to the activated client.

5. The non-transitory storage medium as claimed in claim 4, wherein the client interface is further configured to activate the client to pass the user identifier to one of the service providers.

6. The non-transitory storage medium as claimed in claim 1, wherein the service agent is further configured to perform all of the computer-mediated functions for the user.

7. The non-transitory storage medium as claimed in claim 1, wherein the service agent is further configured to provide the service activation key to the user with a prompt for the user to send the service activation key to the first one of the service providers in order to initiate service delivery.

8. The non-transitory storage medium as claimed in claim 1, wherein the service agent is further configured to provide confirmation concerning completion of the computer-mediated functions in advance of, and to enable, service delivery.

9. The non-transitory storage medium as claimed in claim 1, wherein the service agent is further configured to receive a confirmation key and to provide the received confirmation key to the first one of the service providers.

10. A communications system, comprising:
a plurality of user devices having different types of processing systems, each processing system including a hardware processor and associated local memory, each of the plurality of user devices having installed thereon a service agent configured to at least:
(a) communicate with a remote operator of computer-mediated services;
(b) provide the same common interface to the operator regardless of the type of processing system of the particular user device on which the service agent is installed; and
(c) provide a client interface for activating a client on the respective user device;
the client interface being configured to at least:
(d) activate the client to contact service providers that are separate and remote from the operator and the plurality of user devices;
(e) selectively activate the client to download content from the service providers; and
the service agent being further configured to provide computer-mediated functions for the respective client, comprising:
authentication with the operator of the identity of a user of the respective user device;
reception, from a first one of the service providers via the operator, of an electronic request indicating payment required for a service to be provided by the first one of the service providers, and provision of a prompt to the user to act on the received electronic request, in response to one of (i) the client on the respective user device having contacted the first one of the service providers and requested that service to be provided by the first one of the service providers, and (ii) another client on another user device having contacted the first one of the service providers and requested that service to be provided by the first one of the service providers;
reception, from the user, of an electronic response to the prompt indicative that the required payment is to be made, and forwarding of the received response to the operator;
reception of a service activation key from the operator;
forwarding of the received service activation key in order to initiate the service to be provided by the first one of the service providers; and
provision of the received service activation key to the respective client to initiate download of content, automatically and without user intervention, by the respective client, as part of the service to be provided by the first one of the service providers.

11. A user device, comprising:
at least one hardware processor configured to execute a service application on the user device to conduct communication with one or more remote operators of respective computer-mediated services and to provide a uniform interface to the one or more operators as compared to another type of user device, wherein the execution of the service application is configured to at least:
selectively activate a client function on the user device to contact a first one of a plurality of service providers and to download content from the first service provider, the service providers being separate and remote from the one or more operators and the user device;
authenticate a user's identity with a first one of the one or more operators;
receive an electronic request indicating payment required for a service to be provided by a first one of the service providers from the first one of the service providers via the first operator, and prompt the user to act on the received electronic request;
receive a service activation key from the first operator and forward the received service activation key in order to initiate service delivery; and
provide the received service activation key to the client function to initiate download of content from the first service provider as part of the service delivery,
wherein the service application of the user device is further configured to cooperate with another service application provided to the other type of user device to communicate with the one or more operators in providing the uniform interface, the cooperation between the service application of the user device and the another service application enabling the user to contact a given one of the service providers and select a given service, move to another user device, receive a corresponding electronic request indicating payment required for the given service to be provided by the given one of the service providers at the another user device, respond to the corresponding electronic request, and obtain corresponding content from the given one of the service providers at the another user device using a correspondingly received service activation key.

12. The user device as in claim 11, wherein the activated client function is a browser.

13. The user device as in claim 11, wherein the service application is further executable to include:
communication with an ordering system comprising one or more of the remote service providers; and
provision of a uniform interface to the ordering system for the user device and the other type of user device.

14. The user device as in claim 11, wherein the service application is further executable to include passing of a user identifier to the activated client function.

15. The user device as in claim 14, wherein the service application is further executable to include activation of the client function to pass the user identifier to one of the service providers.

16. The user device as in claim 11, wherein the service application is further executable to include performance of functions for the user in advance of, and to enable, service delivery.

17. The user device as in claim 11, wherein the service application is further executable to include provision of the service activation key to the first service provider in order to initiate service delivery.

18. The user device as in claim 11, wherein the service application is further executable to include provision of the service activation key to the user with a prompt for the user to send the service activation key to the first service provider in order to initiate service delivery.

19. The user device as in claim 11, wherein the service application is further executable to include provision of confirmation in advance of, and to enable, service delivery.

20. The user device as in claim 11, wherein the service application is further executable to include reception of a confirmation key from the first operator, and to provide the received confirmation key to the first service provider.

21. A non-transitory machine-readable storage medium storing instructions corresponding to a service agent, the service agent being installable to a plurality of user devices of different types and being able to provide in cooperation with one or more other service agents provided on the plurality of the user devices a uniform interface between such devices and a remote service agency operator system, wherein the service agent, when installed on a given user device and executed by a hardware processor thereof, is configured to execute functionality comprising:
activation of a client on the given user device;
control the client to selectively contact service provider systems that are separate and remote from, but in communication with, the service agency operator system and the given user device;
authentication, by the service agent, of a user's identity with the service agency operator system;
reception of an electronic request indicating payment required for a service to be provided by a first one of the service provider systems from the first one of the service provider systems via the service agency operator system;
prompting of the user to act on the received electronic request;
reception of a service activation key from the first service provider system, conditioned on the user satisfactorily responding to the received electronic request as determined in connection with a first one of a plurality of back-end server systems with which the service agency operator system, but neither the given user device nor the service provider systems, is in direct communication; and
forwarding of the received service activation key to the client in order to initiate service delivery from first service provider system,
wherein the cooperation includes enabling the user to contact a given one of the service provider systems and select a given service, move to another user device, receive a corresponding electronic request indicating payment required for the given service to be provided by the given one of the service provider systems at the another user device, respond to the corresponding electronic request, and receive corresponding service delivery from the given one of the service provider systems at the another user device using a correspondingly received service activation key.

22. The non-transitory storage medium as claimed in claim 21, wherein the reception of the electronic request is responsive to a service selection having been made using the client and having been forwarded to first service provider system.

23. The non-transitory storage medium as claimed in claim 21, wherein a determination that the user has satisfactorily responded to the received electronic request is conditioned on transmission of (a) a first communication from the service agency operator system to the first back-end server system, (b) a second communication from the service agency operator system to the first service provider system, and (c) a notification regarding the first communication from the first back-end server system for the first service provider system.

24. The non-transitory storage medium as claimed in claim 23, wherein the first and second communications are initiated by the service agency operator system responsive to the prompting.

25. The non-transitory storage medium as claimed in claim 24, wherein the notification is generated in response to the transmission of the first communication.

26. The non-transitory storage medium as claimed in claim 21, wherein the service activation key is received by the client from the first service provider system via the service agency operator system.

27. The non-transitory storage medium as claimed in claim 21, wherein the client is configured to initiate download of content, automatically and without user intervention, from the first service provider as part of the service delivery.

28. A non-transitory machine-readable storage medium storing instructions installable to a plurality of user devices having different types of processing systems, each processing system including a hardware processor and associated local memory, the instructions being configured to be executable, by the particular user device on which the instructions are installed and run, to provide a service agent configured to at least:
(a) communicate with a remote operator of computer-mediated services,
(b) provide a uniform interface to the operator for the plurality of the user devices regardless of the type of processing system executing the instructions, and
(c) provide a client interface for activating a client on that particular user device;
wherein that client interface is configured to at least:
(d) activate the respective client to contact service providers that are separate and remote from the operator and the plurality of user devices, and
(e) selectively activate the respective client to download content from the service providers;

wherein the service agent is further configured to provide computer-mediated functions for the respective client, comprising:

(f) authentication with the operator of the identity of a user of that particular user device;

(g) reception, from a first one of the service providers via the operator, of an electronic request indicating payment required for a service to be provided by the first one of the service providers, and provision of a prompt to the user to act on the received electronic request;

(h) reception, from the user, of an electronic response to the prompt indicative that the required payment is to be made, and forwarding of the received response to the operator;

(i) reception of a service activation key from the operator;

(j) forwarding of the received service activation key in order to initiate the service to be provided by the first one of the service providers; and (k) provision of the received service activation key to the respective client to initiate download of content, automatically and without user intervention, by the client, as part of the service to be provided by the first one of the service providers; and wherein each service agent is further configured to cooperate with another such service agent provided on another of the plurality of user devices to help with the making of the required payment, wherein the cooperation includes enabling the user to contact a given one of the service provider systems and select a given service, move to another user device, receive a corresponding electronic request at the another user device, respond to the corresponding electronic request, and receive corresponding service delivery from the given one of the service provider systems at the another user device using a correspondingly received service activation key.

* * * * *